United States Patent [19]

Alpers

[11] 3,711,639
[45] Jan. 16, 1973

[54] TELEVISION TARGET TRACKING SYSTEM

[75] Inventor: Frederick C. Alpers, Riverside, Calif.

[73] Assignee: The United States of America as represented by the Secretary of the Navy

[22] Filed: Dec. 29, 1969

[21] Appl. No.: 79,469

[52] U.S. Cl.................178/6.8, 178/7.7, 178/DIG. 21
[51] Int. Cl..................................................H04n 3/16
[58] Field of Search..................343/7.3; 178/6.8, 7.7

[56] References Cited

UNITED STATES PATENTS

| | | | |
|---|---|---|---|
| 2,838,602 | 6/1958 | Sprick | 178/6.8 |
| 2,939,909 | 6/1960 | Toulon | 178/6.8 |

*Primary Examiner*—Benjamin A. Borchelt
*Assistant Examiner*—H. A. Birmiel
*Attorney*—Joseph M. St. Amand, Thomas M. Phillips and W. O. Quesenberry

EXEMPLARY CLAIM

3. In a television type target tracking system a figure eight scan system comprising: a scan frequency oscillator for generating an output voltage, sin $\omega t$, a frequency doubler circuit coupled to said scan frequency oscillator for generating a synchronized voltage, sin $2\omega t$, television camera means including deflection coils and an imaging tube, circuit means coupling the output of said scan frequency oscillator and said frequency doubler as inputs to said deflection coils, vertical gate generator means having an input coupled to said scan oscillator and being triggered by the output sine wave of said scan oscillator near the zero value, horizontal gate generator means coupled to said scan oscillator through a 180° phase shifter and being triggered by the output sine wave of said scan oscillator near the zero value, tracking coincidence circuits coupled to the outputs of said vertical and horizontal gate generators and said television camera means for generating a first output signal representing the horizontal position of a target edge and a second output signal representing the vertical position of the target edge, and circuit means coupling said first and second output signals to the deflection coils of said television camera means.

4 Claims, 11 Drawing Figures

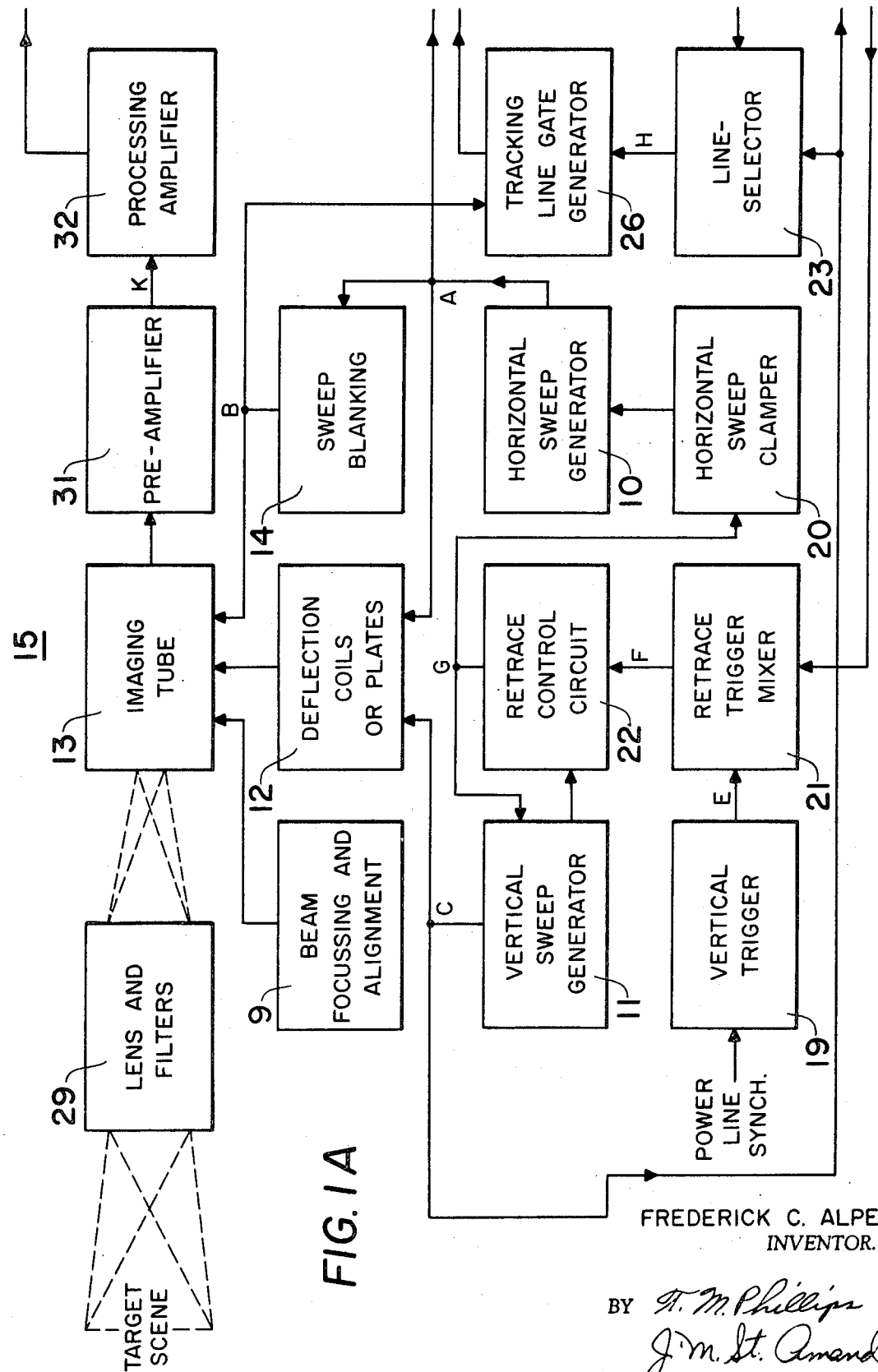
FIG. IA

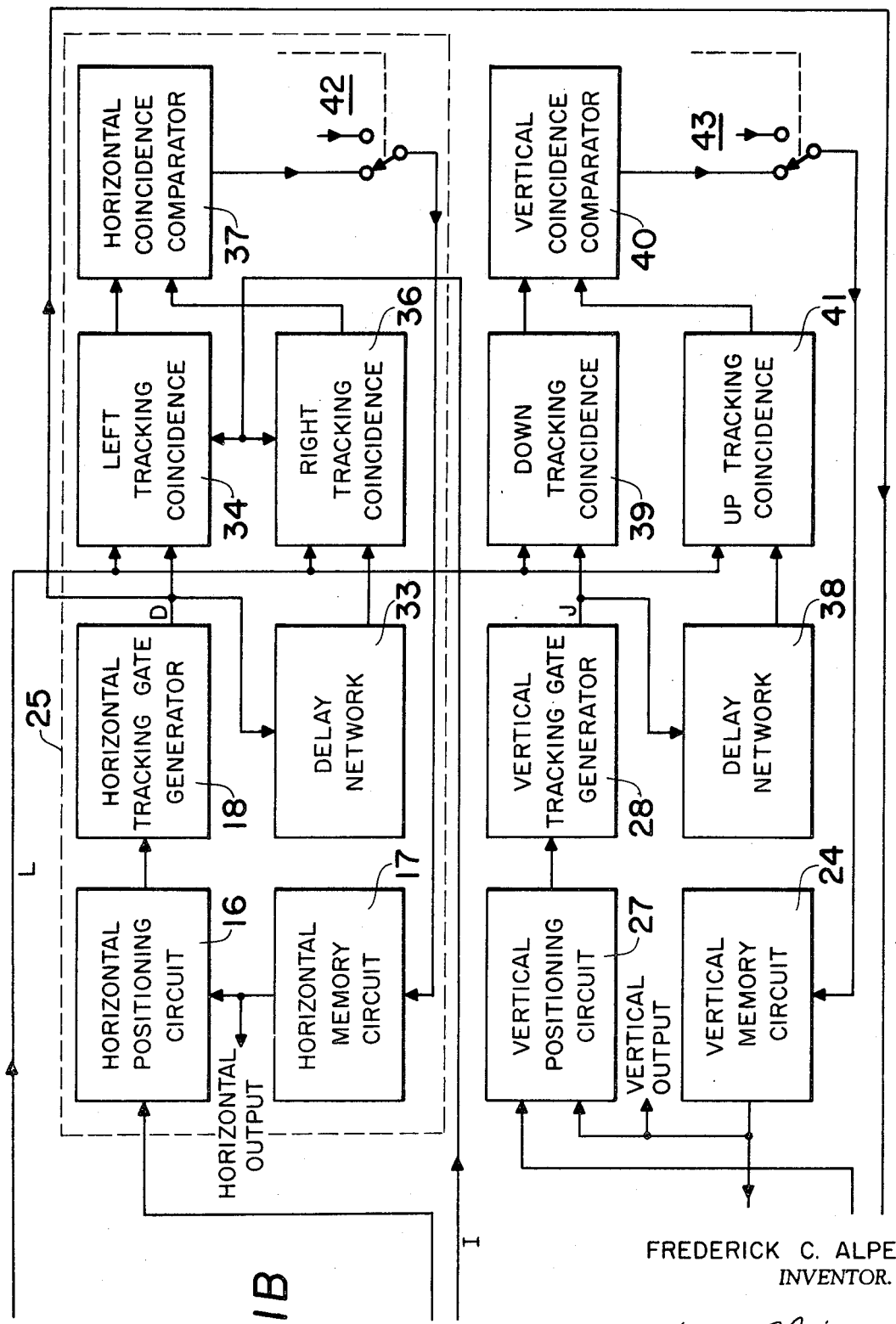

FREDERICK C. ALPERS
INVENTOR.

BY *T. M. Phillips*
*J. M. St. Amand*
ATTORNEYS.

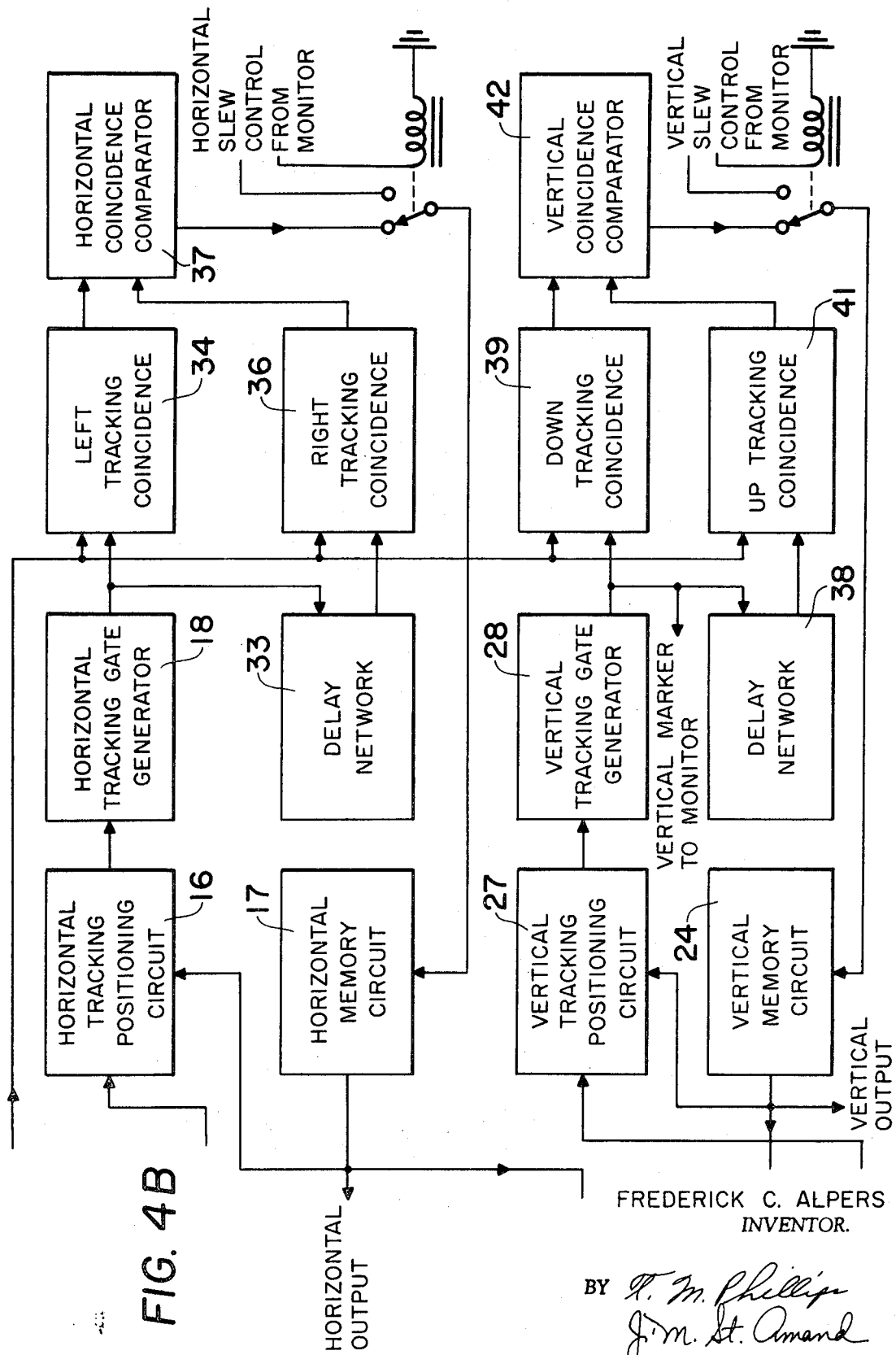

FREDERICK C. ALPERS
INVENTOR.

TELEVISION TARGET TRACKING SYSTEM

The invention herein described may be manufactured and used by or for the Government of the United States of America for governmental purposes without the payment of any royalties thereon or therefor.

The present invention relates to television target tracking systems and more particularly to television target tracking systems utilizing vertical retrace.

The present invention involves a means for deriving directional information relative to a target by directing a television-type camera toward a target scene, scanning the target scene by employing a raster similar to that used in the well-known television applications, processing video information gained from the camera system so as to derive a signal where changes in contrast occur (as at the edges of a target), applying radar range type tracking techniques to track these edge signals, and deriving voltages proportional to the position of the target in the raster through this edge tracking function. The particular system of this invention uses a chosen line in the normal television raster for a horizontal tracking function and uses a special vertical retrace of the beam through the raster between frames to give a corresponding vertical tracking line.

An object of the present invention is the provision of a television target tracking system which has an increased information rate and greater accuracy than known systems.

Another object is to provide a television target tracking system which provides a special vertical retrace of the beam through the raster between frames to give a corresponding vertical tracking line.

Other objects and many of the attendant advantages will become readily appreciated as the same becomes better understood by reference to the following detailed description when considered in connection with the accompanying drawings wherein:

FIGS. 1A and 1B is a block diagram of one embodiment of the invention.

FIGS. 4A and 4B is a block diagram of another embodiment of the invention.

Figure 2:
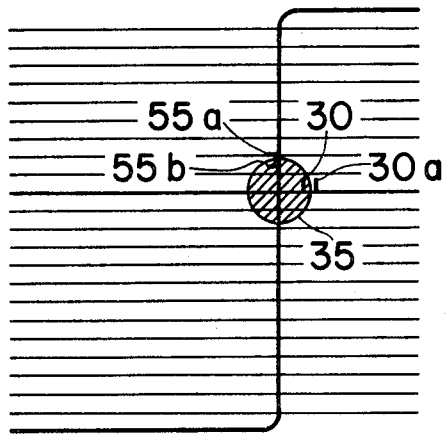
FIG. 2 shows the nature of the vertical retrace raster of FIG. 1.
Figure 3:
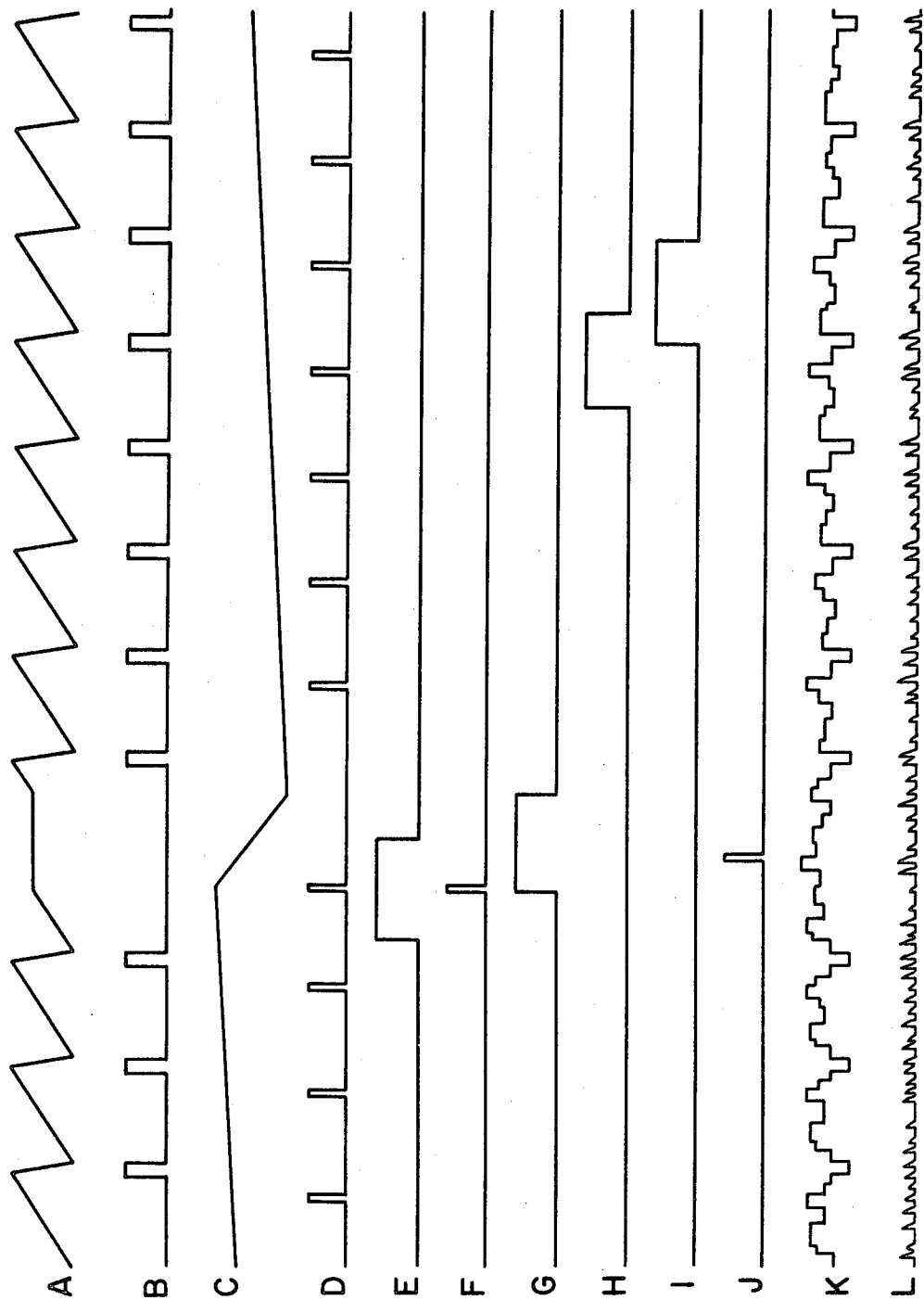
FIG. 3 shows the principal waveforms involved.

Referring now to the drawings wherein like reference characters designate like or corresponding parts throughout the several views. There is shown in FIG. 1 in conjunction with FIGS. 2 and 3 the operation of one embodiment of the invention. There is shown in FIG. 1 a horizontal sweep generator 10 and a vertical sweep generator 11. Normally horizontal sweep generator 10 is operated at a much higher repetition frequency than vertical sweep generator 11 and in a typical application the horizontal sweep generator might produce sawtooth waveforms at approximately 15,000 cycles per second, while the vertical sweep generator produces such waveforms at approximately 60 cycles per second. The faster sweep generator is made to affect scanning of the television type camera in a horizontal direction for the sole reason of conformance with conventional television systems. The output of horizontal sweep generator 10, waveform A, FIG. 3, is applied to the deflection coils or plates 12 of imaging tube 13 of a television type camera 15 to produce horizontal scan lines as shown in FIG. 2. The output of horizontal sweep generator 10 is also connected as an input to sweep blanking circuit 14 which functions in the conventional television manner to eliminate the horizontal retrace of the imaging tube beam. The blanking voltage which serves this function appears as waveform B, FiG. 3. THe output of vertical sweep generator 11 is shown as waveform C. As shown, the output of horizontal sweep generator 10 is an uninterrupted saw-tooth wave except during the recovery or retrace of the vertical sweep generator 11, waveform C. During this retrace, the output of horizontal sweep generator 10 is held at a constant value by techniques which will be described later.

With reference to FIG. 3, waveform A from horizontal sweep generator 10 is applied to horizontal positioning circuit 16, FIG. 1B, which develops an output pulse when the saw-tooth of waveform A rises to equal the value of a voltage supplied to horizontal positioning circuit 16 from horizontal memory circuit 17. The output of horizontal positioning circuit 16 is then utilized by horizontal tracking gate generator 18 to produce a gating pulse shown as waveform D. Thus, there is one pulse occuring in waveform D each time the output of horizontal sweep generator 16 increases to a voltage value equal to that supplied from horizontal memory circuit 17. Since horizontal sweep generator 10 is normally a free-running circuit, vertical sweep generator 11 is controlled to operate in synchronism with a vertical trigger 19 which in turn may be synchronized to an available power line frequency if so desired. Vertical trigger 19 has an output as shown in waveform E. A retrace trigger mixer 21 uses coincidence between the output of trigger A, waveform E, and the occurrence of the output of repetition horizontal tracking gate 18, waveform D, to derive an output, waveform F, which initiates vertical retrace circuit 22 to produce waveform G, which governs the duration as well as the initiation of the vertical retrace. The effective circuit action is then that horizontal tracking lines are produced in the raster at a fixed rate until sufficient time has elapsed that the scanning nears the bottom edge of the imaging tube, at which time a vertical trigger occurs. However, retrace action does not begin with this vertical trigger but awaits the arrival of the horizontal tracking gate. By means which shall be explained later, the vertical retrace is then made to occur along the horizontal coordinate of the raster on which the target lies and thus the retrace passes through the target. With horizontal scanning clamped, retrace action continues vertically through the raster until the top of the raster is reached, at which time horizontal scanning resumes and a new frame of the raster begins.

Choice of the particular scanning line used for horizontal tracking is made in a line selector circuit 23 in the following manner: When the output of vertical sweep generator 11, waveform C, rises to a voltage equal to a voltage supplied from vertical memory circuit 24, waveform H is then fed from line selector circuit 23 to tracking line gate generator 26 which also receives a horizontal sweep signal from sweep blanking circuit 14 in the form of waveform B. Coincidence between waveform H and one of the signals in waveform B initiates action of tracking line gate generator 26 and results in waveform I, which is made to last slightly more than one horizontal scanning cycle. Waveform I is later used to permit horizontal tracking action only while it is present, and thus in effect it serves to select one particular horizontal line in the raster for such tracking action. A vertical tracking gate, waveform j, is made to occur when waveform C falls (rather than rises) to a voltage equal to the voltage supplied by the vertical memory circuit 24. This action is effected by vertical positioning circuit 27 and vertical tracking gate generator 28 which function in a manner similar to horizontal positioning circuit 16 and horizontal tracking gate generator 18 described above.

The television type camera 15 consists of a lens and filter system 29, imaging tube 13, a pre-amplifier 31, and a special processing amplifier 32. The lens serves to focus an image of a target scene on the sensitive face of imaging tube 13. Scanning of this face by the electron beam within the imaging tube then causes video signals to be generated which are amplified by pre-amplifier 31, the output of which is a waveform, such as waveform K, depending upon the particular target scene which is viewed. Waveform K is fed through special processing amplifier 32 to produce output signals, shown as waveform L, whenever a change in the level of the video signal occurs.

Horizontal tracking of an edge of the target represented by one particular pulse and waveform L is affected by a closed loop 25 involving horizontal positioning circuit 16, horizontal tracking gate generator 18, and horizontal memory circuit 17, plus delay network 33, left and right tracking coincidence circuits 34, 36 and horizontal coincidence comparator 37. Tracking is initiated by a slew control (not shown) manipulated by an operator so that the gate position initially corresponds with an appropriate edge of the desired target. The slew control is brought about by adjusting horizontal memory circuit 17 until the tracking gate comes at the desired spot along the horizontal scan line. A marker signal on a monitor oscilloscope aids the operator in performing this function. This is accomplished while switches 42, 43 are in the alternate position, that is in the slew position.

During automatic horizontal tracking, which occurs after the operator relinquishes control of the tracking loop, horizontal tracking gate, waveform D and a slightly delayed (upon the order of one microsecond) form of this gate are applied to the left and right tracking coincidence circuits 34, 36 respectively. Outputs of the coincidence circuits are compared in horizontal coincidence comparator 37 which affects a positive correction in the horizontal memory circuit 17 output if the signal from right tracking coincidence circuit 36 predominates, and a negative correction if the left tracking coincidence predominates. Coincidence of the undelayed tracking gate with the suitable target edge signal of waveform L causes action of the tracking loop which results in positioning the tracking gate further to the left to reduce this coincidence while a corresponding coincidence in the right tracking coincidence circuit between that same edge signal of the waveform L and the delayed tracking gate causes the opposite correction and motion of the tracking gate to the right. Hence, once tracking is initiated, the over-all action is that of causing tracking gate 30 and the delayed form 30a (FIG. 2) thereof to straddle the chosen edge signal found in the output of processing amplifier 32. If the target tends to move to the left in raster, corrections are made which cause the gate to follow the target to the left, and vice versa if the target's motion is to the right.

In producing the above tracking action, corrections are made in the output of horizontal memory circuit 17 which together with the initial signal supplied thereto by the operator, keeps horizontal memory circuit 17 output proportional to the horizontal coordinate of the position of the desired target edge in the raster. Thus, the output of this particular circuit serves as the horizontal output of the system which may be used as a control signal or may be recorded as a time record of the position of the target for instrumentation purposes. Vertical positioning circuit 27, vertical tracking gate generator 28, delay network 38, and vertical memory circuit 24, down and up tracking coincidence circuits 39, 41 and vertical coincidence comparator 40 perform the vertical tracking function in a similar manner as that described above for the horizontal tracking. In this tracking loop vertical tracking gate 55a and a delayed form 55b thereof are made to straddle a signal representing the horizontal edge of the target, FIG. 2, so that up and down tracking coincidence circuits 39, 41 effect correction in the vertical memory circuit output voltage and thereby yield a vertical output proportional to the vertical coordinate of target 35.

To assure that a horizontal tracking line is selected which occurs at the same vertical coordinate as the vertical tracking gate which is following the target through the vertical tracking loop action, the same voltage which is used for the vertical positioning circuit in the vertical tracking loop is used for line selector circuit 23. The equality of voltages which are used to define action of line selector 23 and vertical positioning circuit 27, respectively, then relate to the same reference voltage, the only difference being that one occurs during the slow rise of waveform C while the other occurs at the same voltage during the relatively rapid retrace. Because target 35 has a definite size, a strict identity of horizontal and vertical coordinates is not desired and some small offset as shown in FIG. 2 is affected by introducing fixed biases in horizontal and vertical tracking circuits.

Figure 5:
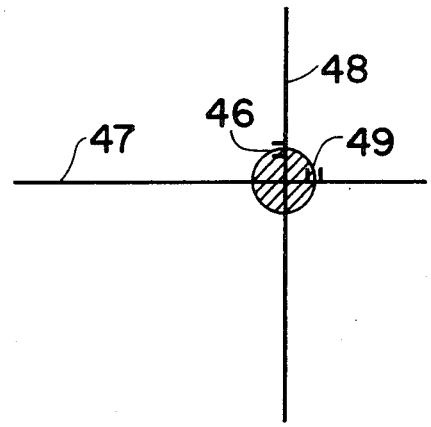
FIG. 5 illustrates the raster for the embodiment of FIG. 4.
Figure 4A:
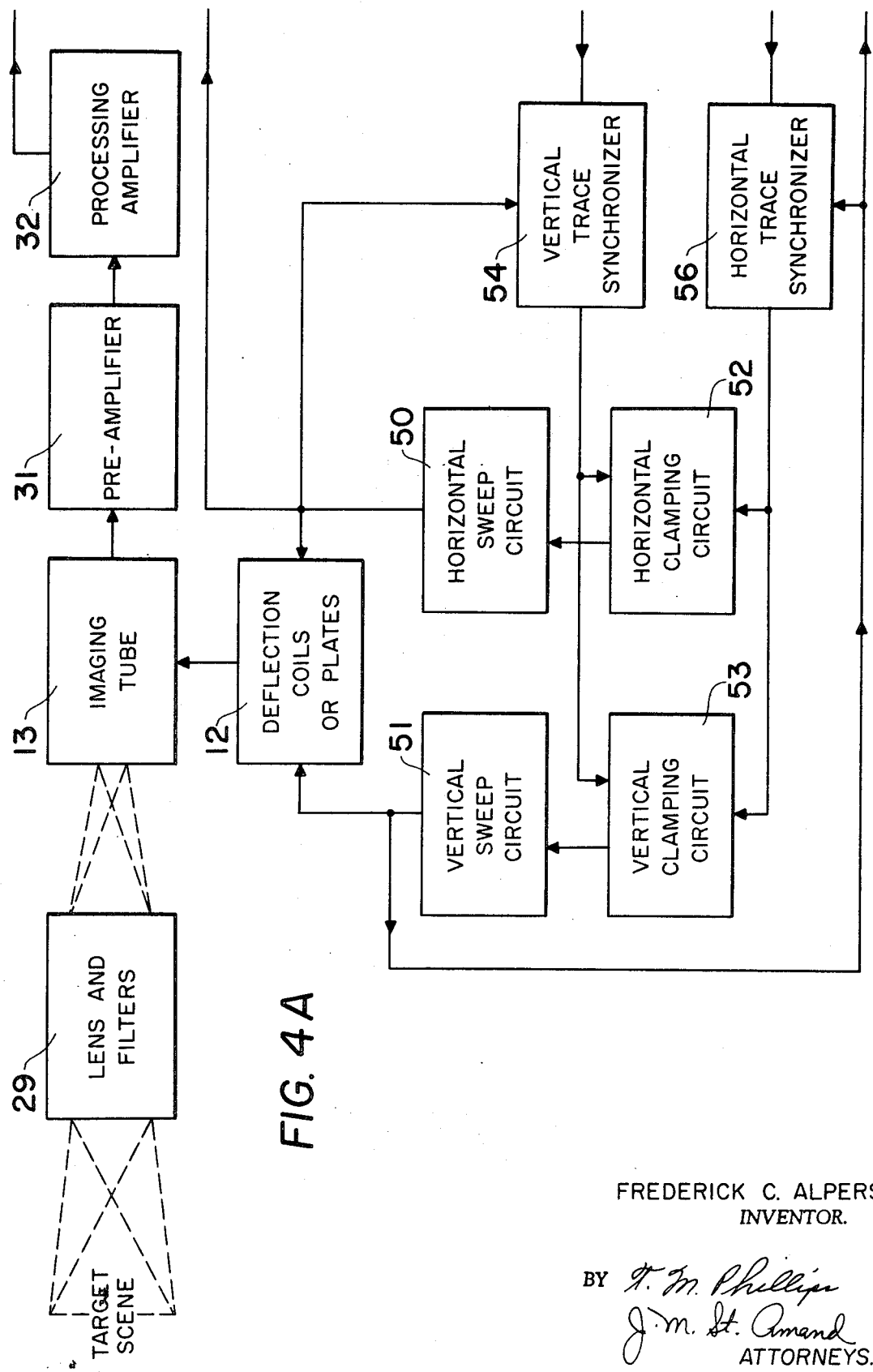

In the systems of FIG. 4, the major portion of the raster which normally serves to reconstruct an image of a target scene for benefit of an operator has been reduced for reasons of simplicity and only a single horizontal tracking line 47 and a vertical retrace line 48 (FIG. 5) have been retained. The tracking principals of this system are the same as those of the system of FIG. 1; i.e., horizontal tracking is obtained by a gating arrangement which straddles a vertical edge 49 of target 35 and vertical tracking by a similar arrangement straddling horizontal edge 46, while the two tracking actions are interconnected to assure that the tracking lines pass through target 35.

The primary difference between the system of FIG. 1 and the system of FIG. 4 is that the system of FIG. 4 utilizes horizontal and vertical sweep circuits 50, 51, horizontal and vertical clamping circuits 52, 53 and horizontal and vertical synchronizers 54, 56.

In the operation of the system of FIG. 4, vertical and horizontal sweep circuits 50, 51 are saw-tooth generating circuits which operate in a similar manner to horizontal sweep generator 10 of FIG. 1. Horizontal sweep circuit 50 rises to a peak value, causing the beam to scan horizontally across the raster and begins to fall off sharply in a normal saw-tooth fashion for beam retrace. As the signal falls, it reaches a voltage equal to the horizontal output voltage from the horizontal tracking circuit. Vertical trace synchronizer 54 compares the two voltages and generates a pulse when the two voltages are equal. The output pulse of synchronizer 54 is coupled to horizontal and vertical clamping circuits 52, 53. This pulse initiates clamping of sweep circuit 50 so that the fall of the waveform from sweep circuit 50 is discontinued and the output is maintained constant. The same pulse reaching vertical clamping circuit releases the clamping action of that circuit and allows previously clamped vertical sweep circuit 51 to complete its retrace and a new vertical saw-tooth waveform to begin. The vertical sweep circuit then produces an output waveform which rises to a peak value, causing a vertical scan across the raster, and begins falling off sharply for retrace again in the normal saw-tooth fashion. When the output voltage of vertical sweep circuit 51 falls to a value equal to the vertical output voltage from the vertical tracking circuit, horizontal trace synchronizer generates an output pulse which is also supplied to clamping circuits 52, 53. this output pulse causes clamping of vertical clamping circuit 53 and releases horizontal clamping circuit 52 in the same manner that the pulse from vertical trace synchronizer accomplished the opposite results. The resultant scanning action obtained by applying the vertical and horizontal sweep circuit outputs to the deflection coils or plates 12 of imaging tube 13 is then the two orthogonal sweep lines shown in FIG. 5. Tracking action is very much the same as that of the vertical retrace system of FIG. 1 with horizontal and vertical tracking loops yielding the horizontal and vertical output voltages.

Figure 7:
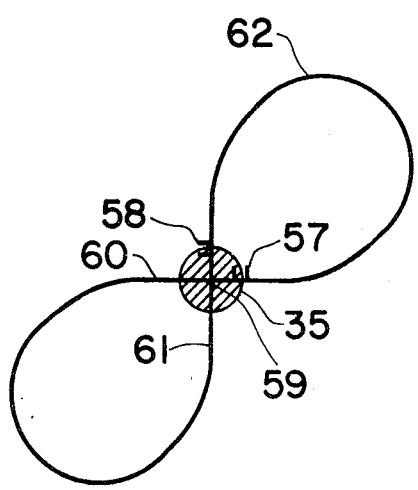
FIG. 7 illustrates the raster for the embodiment of FIG. 6.
Figure 8:
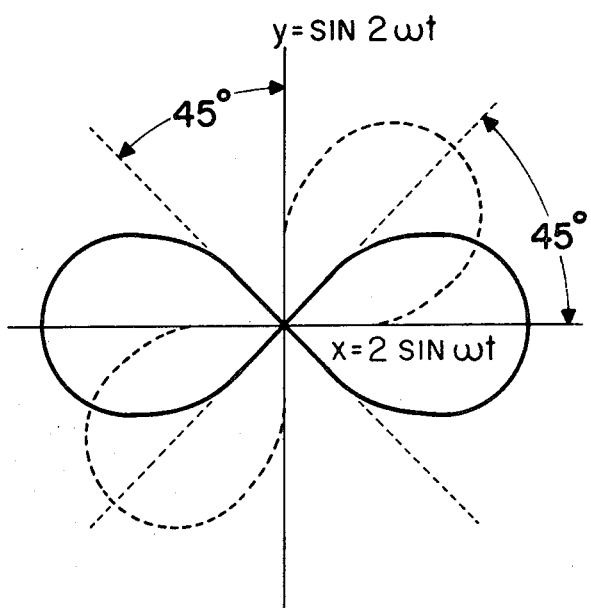
FIG. 8 illustrates the method by which the raster of FIG. 7 is obtained.
Figure 6A:
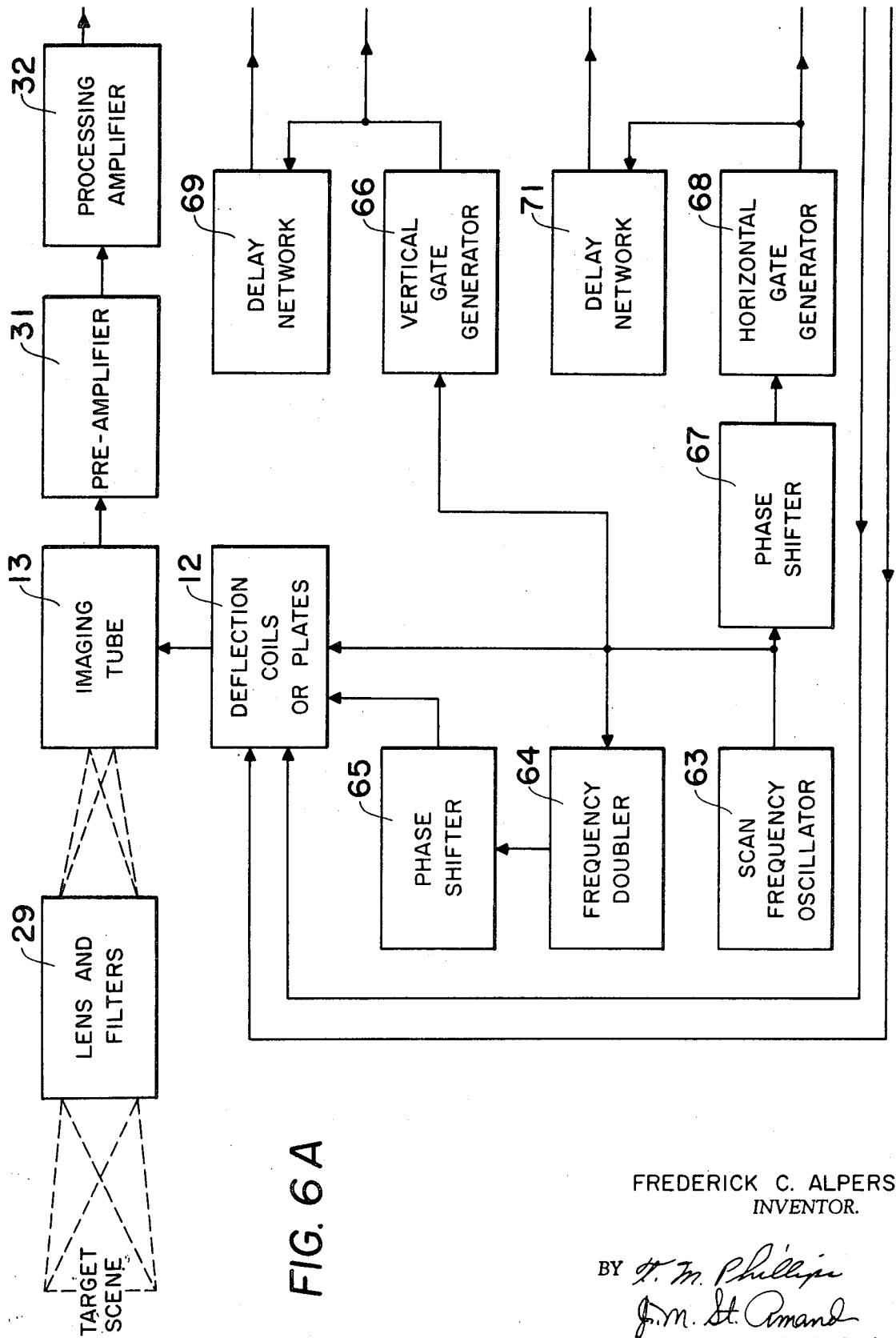
FIGS. 6A and 6B is a block diagram of still another embodiment of the invention.
Figure 6B:
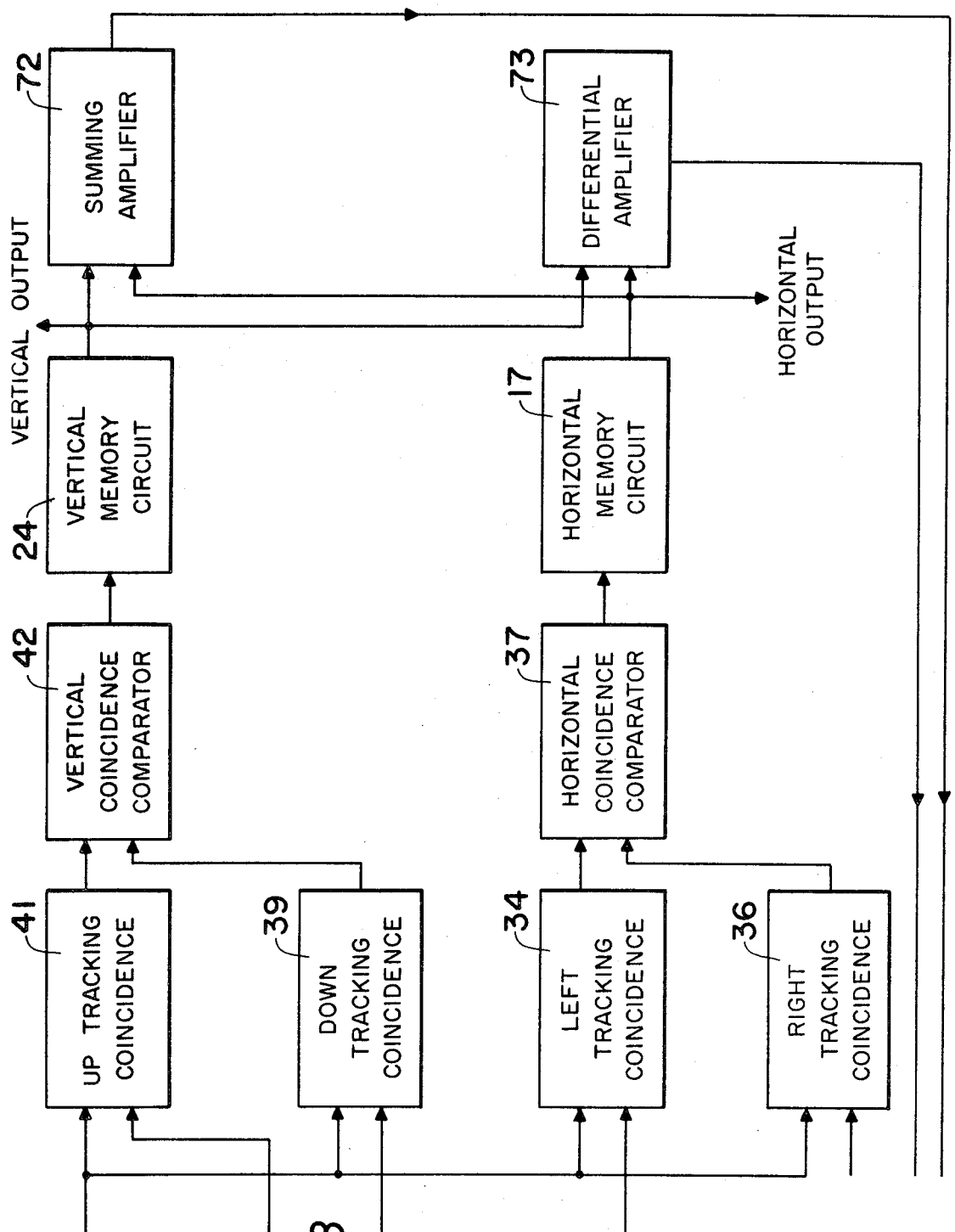

Referring now to FIGS. 6, 7 and 8 which show the FIG. 8 scanning system. When tracking, target 35 is centered at the crossing point in the middle of the FIG. 8 and gate positions 57, 58 are adjusted to track the target edges which are slightly off crossing point 59. Lines 60, 61 are made to cross at right angles to each other so that the scanning action across target 35 produces two orthogonal scanning lines.

The figure eight loop is formed by two sinusoidal signals applied at right angles to each other, as shown in FIG. 8. If the signal applied along an X axis is made equal to 2 sin ωt while that along an orthogonal Y axis is made equal to sin 2 ωt, trigometeric considerations will show that the resulting curve traced out as a function of time is expressed by the equation $$Y = \sqrt{1 - \frac{X^2}{4}}.$$

From this, the slope of the curve is:

$$\frac{dy}{dX} = \sqrt{\frac{2 - X^2}{4 - X^2}}.$$

At the crossover point:

$X = 0$ and $dy/dX = \pm 1$, which indicates that the crossover lines are orthogonal. To make these crossover lines coincide with normal horizontal and vertical axes, the XY reference system must be rotated through 45°. The result is then the trace 62 shown in FIg. 7.

In FIG 6, scan frequency oscillator 63 supplies the sin ωt function needed for X-axis deflection. It also supplies a signal to frequency doubler 64 which then generates a synchronized function, sin 2ωt, for Y-axis deflection. The X and Y sinusoidal signals are applied directly to deflection coils or plates 12 of tube 13 and these coils or plates are oriented at 45° to their normal axes so that the resultant crossbar follows the normal horizontal and vertical directions as explained above. Phase shifter 65 is coupled between frequency double 64 and deflection coils or plates 12 to cancel out any phase angle inherent in the frequency doubler 64. To establish gate position at desired points in the figure eight raster, the output of oscillator 63 is used to trigger vertical gate generator 66 at a desired point near the zero value of the sine wave. The output of oscillator 63 is also passed through phase shifter 67, for approximately 180° phase shift, to trigger horizontal gate generator 68. The biases of gate generators 66 and 68 may be adjusted to move the gate position back and forth along the trace lines near the center of the raster until the desired positioning is achieved. Gates from gate generator 66 are coupled directly to down tracking coincidence circuit 39 and through delay network 69 to up tracking coincidence circuit 41. Gates from gate generator 68 are coupled directly to right tracking coincidence circuit 36 and through delay network 71 to left tracking coincidence circuit 34. Horizontal and vertical tracking outputs are obtained in the same manner as described in FIG. 1.

To assure the desired positioning of the figure eight scan in the image, correction signals are fed back to deflection coils or plates 12. A summing amplifier 72 is provided to add the horizontal and vertical outputs and differential amplifier 73 is provided to subtract the horizontal and vertical outputs. The sum and difference signals are applied to the deflection coils or plates 12 through a dc connection whereas the scan frequency from oscillator 63 and double scan frequency from doubler 65 are applied through an ac connection. The result is that both sets of signals combine to control the position of the beam. A correction through the summing channel serves to move the figure eight trace in either a horizontal or a vertical direction, depending on the polarity of circuit connections and on the direction of the 45° rotation of the deflection coils. A correction signal from the differential amplifier then causes motion of the figure eight trace in the orthogonal direction to that caused by the summing amplifier output.

Obviously many modifications and variations of the present invention are possible in the light of the above teachings. It is therefore to be understood that within the scope of the appended claims the invention may be practiced otherwise than as specifically described.

What is claimed is:

1. In a television type target tracking system a vertical retrace system comprising: raster generator means including a horizontal sweep generator and a vertical sweep generator; television camera means coupled to said horizontal and vertical sweep generators for generating an output signal proportional to changes in contrast of its raster; blanking circuit means coupled to said horizontal sweep generator for blanking the horizontal retrace of said camera means; horizontal memory circuit means having an output voltage proportional to the horizontal position of a target in the scanning raster of said camera; horizontal positioning circuit means coupled to said horizontal sweep generator means and to said horizontal memory circuit means for generating an output pulse when the output voltage of said horizontal sweep generator means rises to equal the value of the output voltage of said horizontal memory circuit means; horizontal tracking gate generator means coupled to the output of said horizontal positioning circuit means for generating a gating pulse each time said horizontal positioning circuit means generates an output pulse; vertical trigger means having an input coupled to a reference voltage source for generating output pulses of the same frequency as said reference voltage, retrace trigger mixer means coupled to said vertical trigger means and to the output of said horizontal tracking gate generator for generating an output pulse upon the coincidence between the output pulse of said vertical trigger means and the output pulse of said horizontal tracking gate generator; retrace control circuit means coupled to said retrace trigger mixer means and said vertical sweep generator means for initiating and controlling the duration of the vertical retrace voltage of said vertical sweep generator; horizontal sweep clamping means coupled to said retrace control circuit means and to said horizontal sweep generator means for clamping the output of said horizontal sweep generator means for the duration of said vertical retrace voltage; vertical memory circuit means having an output voltage proportional to vertical position of a target in the scanning raster of said camera, line selector circuit means coupled to said vertical sweep generator means and to said vertical memory circuit means for generating an output pulse when the output voltage of vertical sweep generator means rises to equal the output of vertical memory circuit means; tracking line gate generator means coupled to the output of said line selector circuit means and to the output of said horizontal sweep generating means for generating an output pulse of a duration of slightly more than one horizontal scanning cycle upon the coincidence between the output pulse of line selector circuit means and the output of said horizontal sweep generating means; vertical positioning circuit means coupled to the output of said vertical sweep generating means and to said vertical memory circuit means for generating an output pulse when the output voltage of vertical sweep generating means falls to a value equal to the output voltage of said vertical memory circuit, vertical tracking gate generator means coupled to said vertical positioning circuit means for generating a vertical gate upon the occurrence of an output pulse from said vertical positioning circuit means, left tracking coincidence circuit means having a first input coupled directly from said horizontal tracking gate generator means and a second input coupled from said camera means for generating an output voltage proportional to coincidence of said first and second inputs, right tracking coincidence circuit means having a first input coupled to said horizontal tracking gate generator through a first delay network, and a second input coupled from said camera means for generating an output voltage proportional to the coincidence of the first and second inputs applied thereto; horizontal coincidence comparator means coupled to said left and right tracking coincidence circuit means and to said horizontal memory circuit means for causing a rise in the output voltage of said horizontal memory circuit means when the output voltage of said right tracking coincidence circuit predominates, and causing a decrease in the output voltage of said horizontal memory circuit means when the output of said left tracking coincidence circuit means predominates; down tracking coincidence circuit means having a first input coupled directly from said vertical tracking gate generator means and a second input coupled from said camera means for generating an output voltage proportional to the coincidence of the first and second inputs coupled thereto, up tracking coincidence circuit means having a first input coupled to said vertical tracking gate generator through a second delay network and a second input coupled from said camera means for generating an output voltage proportional to the coincidence of the first and second inputs applied thereto; and vertical coincidence comparator means coupled to said up and down tracking coincidence circuit means and to said vertical circuit means for causing a rise in the output voltage of said vertical memory circuit means when the output voltage of said up tracking coincidence circuit predominates and causing a decrease in the output voltage of said vertical memory circuit means when the output of said down tracking coincidence circuit means predominates.

2. In a television type target tracking system a vertical retrace system comprising: raster generating means including a horizontal sweep circuit and a vertical sweep circuit; television camera means coupled to said horizontal and vertical circuits for generating an output signal proportional to changes in contrast of its raster; horizontal tracking circuit means having an output proportional to the horizontal position of a target in the raster of said camera means, vertical trace synchronizer circuit coupled to said horizontal sweep circuit and to said horizontal tracking circuit for generating an output pulse when the output voltage of said horizontal sweep circuit falls to equal the output voltage of said horizontal tracking circuit; horizontal clamping circuit means coupled to said vertical trace synchronizer circuit for initiating clamping of said horizontal sweep circuit upon the occurrence of an output pulse from the vertical trace synchronizer, vertical clamping circuit means coupled to said vertical trace synchronizer for unclamping said vertical sweep circuit, vertical tracking circuit means having an output voltage proportional to the vertical position of a target in the raster of said camera means, horizontal trace synchronizer means coupled to said vertical sweep circuit and said vertical tracking circuit means for generating an output pulse when the output voltage of said vertical sweep circuit drops to a value equal to the output voltage of said vertical tracking circuit means, said horizontal clamping circuit being responsive to the output pulse of said horizontal trace synchronizer for unclamping said horizontal sweep circuit and said vertical clamping circuit being responsive to the output pulse of said horizontal trace synchronizer for clamping said vertical sweep circuit.

3. In a television type target tracking system a figure eight scan system comprising: a scan frequency oscillator for generating an output voltage, sin $\omega t$, a frequency doubler circuit coupled to said scan frequency oscillator for generating a synchronized voltage, sin $2\omega t$, television camera means including deflection coils and an imaging tube, circuit means coupling the output of said scan frequency oscillator and said frequency doubler as inputs to said deflection coils, vertical gate generator means having an input coupled to said scan oscillator and being triggered by the output sine wave of said scan oscillator near the zero value, horizontal gate generator means coupled to said scan oscillator through a 180° phase shifter and being triggered by the output sine wave of said scan oscillator near the zero value; tracking coincidence circuits coupled to the outputs of said vertical and horizontal gate generators and said television camera means for generating a first output signal representing the horizontal position of a target edge and a second output signal representing the vertical position of the target edge, and circuit means coupling said first and second output signals to the deflection coils of said television camera means.

4. the circuit of claim 3 wherein said tracking coincidence circuits comprises: an up tracking coincidence circuit having a first input coupled to the output of said television camera means, a second input coupled through a delay network to the output of said vertical gate generator and an output coupled as a first input to a vertical coincidence comparator; a down tracking coincidence circuit having a first input coupled to the output of said television camera means, a second input coupled directly to the output of said horizontal gate generator and an output coupled as a second input to said horizontal coincidence comparator; a vertical memory circuit having an input coupled to the output of said vertical coincidence comparator and an output coupled as a first input to a summing amplifier and as a first input to a differential amplifier; a horizontal memory circuit having an input coupled to the output of said horizontal coincidence comparator and having an output coupled as a second input to said summing amplifier and as a second input to said differential amplifier; said summing amplifier having an output coupled as a first corrective input to said television camera means for providing horizontal and vertical correction; and said differential amplifier having an output coupled as a second corrective input to said television camera means for providing an orthogonal correction.

* * * * *